Feb. 13, 1968  E. H. LAND ET AL  3,368,447
COMPARISON PHOTOMETER USING REFLECTIVE PATTERN
Filed April 13, 1964
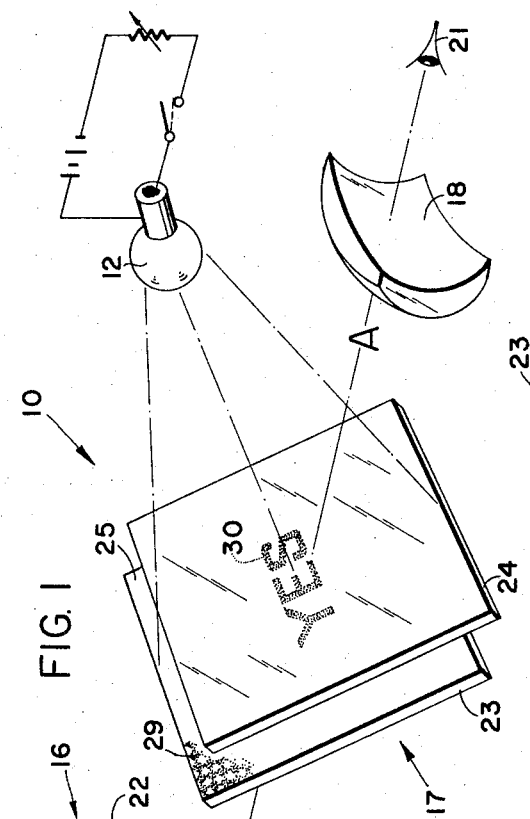
FIG. 1
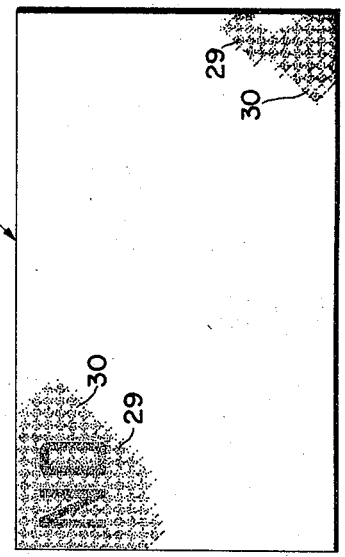
(b)
FIG. 2
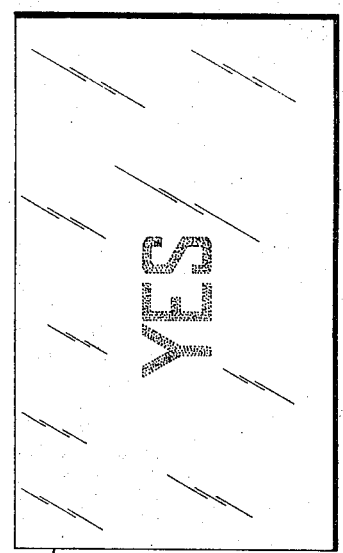
(a)
INVENTORS
Edwin H. Land
BY Dexter P. Cooper, Jr.
Brown and Mikulka
and
Donald M. Sandler
ATTORNEYS United States Patent Office 3,368,447
Patented Feb. 13, 1968

3,368,447
COMPARISON PHOTOMETER USING
REFLECTIVE PATTERN
Edwin H. Land, Cambridge, and Dexter P. Cooper, Jr., Lexington, Mass., assignors to Polaroid Corporation, Cambridge, Mass., a corporation of Delaware
Filed Apr. 13, 1964, Ser. No. 359,113
10 Claims. (Cl. 88—23)

ABSTRACT OF THE DISCLOSURE

A comparison photometer is disclosed which utilizes a target pattern of light-reflective areas interspersed with light-transmissive areas. One light source illuminates a background area visible through the light-transmissive areas while another light source illuminates the reflective areas of the patterned target. Superimposed on the reflective pattern is an index symbol rendered in terms of a low density tone. The index symbol is uniquely intelligible against the pattern of reflective and transmissive areas only at substantial photometric balance between the two light sources. Any substantial departure from photometric balance results in concealment or camouflage of the index symbol because of the relatively high contrast then exhibited between the reflective and light-transmissive of the patterned target.

Conventional comparison photometers involve bringing a light source of unknown brightness into a common field of view with a light source of known and controllable brightness. When the sources are photometerically unbalanced, light and drak areas are defined, the boundary between which is sharp and easily discernible. At balance, the field appears uniformly bright and the boundary between the areas disappears. Thus, the precise point of interest is marked by the disappearance of a pattern defined by contrasting levels of brightness. While such disappearance indicates photometric balance, it is a negative indication apparent to an observer only because he knows that imbalance in one direction produces a pattern of light and dark areas that reverse on passing through balance. For obvious reasons, it would be highly desirable to provide a positive indication to an observer that balance has been achieved. Apparatus capable of presenting to an observer an intelligible pattern in contrasting levels of brightness when the brightness of the two sources has a predetermined relationship (e.g., equality), and an unintelligible pattern when the brightness of the sources has any other relationship, is disclosed and claimed in copending application Ser. No. 359,116, filed Apr. 13, 1964 now Patent 3,323,431, and is the sole invention of Edwin H. Land, one of the joint inventors in this application. The basic invention of the above-identified copending application requires light from each of two independent uniformly illuminated source areas to be viewed in a common field through separate fixed visible patterns that are in registration, that is with both patterns occupying the common field. The configuration of the composite pattern thus formed is dependent, not only on the configuration of the fixed patterns, but on the polarity and magnitude of the photometric imbalance existing between the brightness of the two source areas. Where the magnitude of the imbalance is zero, the brightness of the source areas are equal. By using properly fixed patterns, the composite pattern will define a preselected configuration (or index) at a given value of photometric imbalance. Moreover, a visual indication that such value of imbalance has been reached is provided when the index is there uniquely intelligible, but concealed or camouflaged and made unintelligible when a change in the imbalance produces a changed configuration. Fixed patterns may be selected which cause an index to be intelligible only at photometric balance and provide a positive indication to an observer that photometric balance has been reached.

To achieve the above-described results using a single pattern is the object of this invention. Briefly, the invention utilizes a reflecting pattern, which partially covers a background area and is illuminated by one source of light The background area is illuminated by another source of light and can be seen through the interstices of the pattern. Thus, an observer sees light from the one source reflected from the pattern and light from the other source transmitted through the interstices of the pattern. When the background appears to an observer as bright as the pattern (photometric balance), the latter will disappear and the field will be uniformly illuminated. When the background is brighter than the pattern, the latter appears dark against the background; and when the background is less bright than the pattern, the latter appears light against the background. By interposing in the field of view, a transparent support containing an index symbol rendered visable in terms of a low density tone, the observer will see the index symbol in registration, that is optical alignment, with the pattern. When the pattern is visible (photometric imbalance), the index symbol is also visible but is not intelligible due to the confusing nature of the pattern.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention by those skilled in the art.

For a fuller understanding of the nature and objects of the invention, reference should be had to the following detailed description taken in connection with the accompanying drawings wherein:

FIGURE 1 is a schematic perspective of the photometer of the present invention; and FIGS. 2(a) and (b) are plane views of the transparent supports of the photometer for the purpose of showing the nature of the index symbol and pattern.

Referring now to FIGURE 1, reference numeral 10 designates a comparison photometer in which a single reflecting pattern is utilized. Photometer 10 is used in connection with two independent sources of light denoted at 11 and 12 and termed scene source and reference source respectively. The elements of the structure include field lens 13, variable diaphragm means 14, collecting lens 15, diffuser 16, support means 17 and eyepiece 18 in addition to lamp 12. The field of the photometer is determined by lens 13 which is preferably a transparent support on one surface of which are a plurality of crossed cylindrical lenses. Light passing through lens 13 is incident on diaphragm means 14 which may be conventional and is shown as two reciprocably mounted plates contoured at their overlying edges to define photometer aperture 19. Mechanical coupling 20 between the two plates permits an operator to impart relative sliding movement between the plates and thus selectively control the size of aperture 19 thereby controlling the amount of light incident on lens 15 and diffuser 16. Diffuser 16 may be constituted by a transparent support, one surface of which is specially treated, e.g., by embossing lenticules thereon, to cause incident light to be scattered on transmission through the support so that observer 21 would view diffuser 16, in the absence of support means 17, as a first source of light that defines a background area of substantially uniform illumination which is functionally related to the average brightness of the scene source. Turning now to support means 17 the latter comprises a pair of superposed transparent supports 23 and 24. Surface 25 of support 23 is provided with a reflective pattern 29 distributed over the entire surface of the support but only partially covering such surface. Pattern 29 is rendered in a highly reflective material such as white paint which will efficiently reflect light from lamp 12 into the eye of the observer at 21. The shape of the pattern is important only to the extent that it must conceal, except under the special conditions to be described, the intelligibility of indicia 30 contained on transparent support 24 and rendered in a low density tone. Support 24 is in superposed relationship to support 23 between the latter and eyepiece 18. As shown in the drawings, supports 23 and 24 are inclined relative to the photometer axis A—A so that light from lamp 12 passing through support 24 will uniformly illuminate pattern 29 contained on support 23 without interfering with the observer's view. Pattern 29 thus defines a second light source which is seen by observer 21 in a common field with the first-mentioned light source. In addition, observer 21 looking through eyepiece 18 sees, in the common field, the indicia contained on support 24 superimposed upon pattern 29. The indicia and patterns are seen against the uniformly illuminated background constituted by the light from diffuser 16 incident on the interstices of the pattern.

In the preferred form of the invention, the indicia contained on support 24 is the index symbol "yes," while pattern 29 is a regular checkerboard array with the word "no" superimposed thereon. However, any other index symbol could be used, and the pattern could be irregular or random. The essential feature with regard to the pattern is that it must camouflage the index except under the conditions noted below. For reasons explained below, the essential requirement for the index is that it be rendered in tones distinguishable from the pattern when each is uniformly illuminated.

Pattern 29 will appear dark against a light background when the light from diffuser 16 and passing through the interstices 30 of the pattern elements is brighter than the light from source 12 reflected from the elements. In such case, the indicia "no" would be apparent to an observer and the index symbol, while visible, would not be intelligible. When diaphragm means 14 attenuates the light from source 11 to the extent that the light from diffuser 16 passing through the interstices of the pattern is less bright than the light from source 12 reflected from the element, the pattern will appear bright against a dark background. Again the indicia "no" will be apparent and the index symbol will be camouflaged. At some intermediate adjustment of diaphragm 14, the brightness of light passing the interstices will equal the brightness of light reflected by the pattern (photometric balance) and the pattern will disappear from view as the entire field becomes uniformly illuminated, except for the index "yes" which will then become uniquely intelligible since the index appears to be less bright than the background due to its attenuation of light therefrom. Since the eye can easily resolve minor variations in brightness between adjacent areas, even a slight degree of photometric imbalance will cause the patterned background, against which the index symbol is superimposed, to become apparent to the observer. Thus, the term "uniquely intelligible" refers to a situation where the index symbol is seen against a uniformly illuminated background, or one that does not suggest a pattern.

The position of diaphragm means 14, at which aperture 19 is of such size that the index symbol becomes uniquely intelligible, is functionally related to the average brightness of scene 11 if the brightness of lamp 12 is kept fixed. Thus, the position of the diaphragm means can be calibrated in terms of average scene brightness permitting the disclosed apparatus to function as an exposure meter. Alternatively, the apparatus could be directly incorporated into a camera when the position of the diaphragm is used to establish the exposure value of the shutter mechanism of the camera.

Supports 23 and 24 may conveniently take the form of thin transparent sheets, and for this reason are easily handled by superposing one sheet on the other. For this reason, lamp 12 is shown as illuminating pattern 29 through support 24, but it is believed apparent that the only critical relationship between the sheets and lamp 12 is a requirement that the lamp illuminate at least the pattern. However, separate supports are not necessary and the index symbol can be applied directly onto the pattern 29. In addition, support means 23 can be illuminated when the pattern and index symbol are applied to the surface of diffuser 16 opposite to the surface thereof that is specially treated to cause incident light from the scene to be scattered. With regard to the order of supports 23 and 24, it is preferred that the support containing the index symbol be between the observer and the diffuser as shown. Otherwise, at photometric balance, the index symbol will be obscured somewhat by the portion of the pattern overlying the symbol.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a comparison photometer, the combination of:
   (a) a first light source defining a background area of substantially uniform illumination;
   (b) means defining a reflective pattern partially covering said background area and an index symbol superposed on said reflective pattern;
   (c) a second light source for illuminating said reflective pattern;
   (d) said reflective pattern and index symbol being arranged so that the latter is uniquely intelligible only when the level of brightness of said background area bears a predetermined relationship to the level of brightness of said pattern.

2. Apparatus in accordance with claim 1 wherein said predetermined relationship between the levels of brightness is equality.

3. Apparatus in accordance with claim 2 wherein said reflective pattern includes indicia which are intelligible only when said background area and said pattern are out of photometric balance.

4. Apparatus in accordance with claim 2 provided with:
   (a) a first transparent support, one surface of which is provided with said reflective pattern; and
   (b) a second transparent support superposed on said first support adjacent the surface thereof provided with said reflective pattern, said second transparent support containing said index symbol rendered visible as a low density tone different from that of said transparent support.

5. Apparatus in accordance with claim 4 wherein the other surface of said first transparent support contains means for causing incident light to be scattered on transmission through said first support and constitutes said first light source.

6. In a comparison photometer, the combination of:
   (a) a first light source including a background area that is substantially uniformly illuminated;
   (b) a second light source including a group of elemental reflective areas of a uniform level of brightness;
   (c) an index symbol rendered visible by its contrast with its surroundings;

(d) first means for viewing said sources and said index symbol in a common field of view; and
(e) second means to control the level of brightness of said background area relative to that of said group of elemental reflective areas;
(f) said elemental areas being arranged so that said index symbol is uniquely intelligible only when the level of brightness of said background area bears a predetermined relationship to the level of brightness of said elemental areas.

7. Apparatus in accordance with claim 6 wherein said predetermined relationship between the levels of brightness is equality.

8. Apparatus in accordance with claim 7 wherein said second source includes an essentially transparent support with said group of elemental areas rendered in light reflecting material fixed thereon; and said first means includes a mounting by which said first source is viewed through said transparent support simultaneously with light reflected from said group of elemental areas.

9. Apparatus in accordance with claim 8 wherein the arrangement of said elemental areas is such that another index symbol is intelligible whenever the level of brightness of said background area is not equal to the level of brightness of said elemental areas.

10. A photometric device by which the brightness of two light sources can be compared comprising:
(a) means defining a background area of substantially uniform illumination receiving light from a first light source;
(b) means defining a pattern of discrete reflective areas interspersed with light-transmissive areas covering said background area such that the brightness of said light-transmissive areas is determined by the brightness of said background area;
(c) means defining an index symbol rendered in terms of a low density tone superimposed on said pattern;
(d) means for illuminating said index symbol and the reflective areas of said pattern with light from a second light source, said symbol and said pattern being constructed and arranged to render said symbol as the dominant perceptible element in said field of view when the pattern exhibits a relatively low brightness contrast and to render said pattern as the dominant perceptible element in said field of view when the pattern exhibits a relatively high brightness contrast; and
(e) means for adjustably varying the relative amounts of illumination supplied to said pattern by said first and second light sources to alter the brightness contrast between the reflective and transmissive areas of said pattern, whereby said index symbol is concealed or camouflaged by the dominance of said pattern when the latter exhibits a relatively high contrast, but becomes uniquely perceptible against said pattern when the contrast of said reflective and transmissive areas is low at or near photometric balance.

References Cited
UNITED STATES PATENTS

| | | | |
|---|---|---|---|
| 2,246,817 | 6/1941 | Sauer | 88—23 |
| 2,333,759 | 11/1943 | Akelaitis | 88—23 X |
| 3,323,430 | 6/1967 | Cooper | 88—23 X |
| 3,323,431 | 6/1967 | Land | 88—23 X |

JEWELL H. PEDERSEN, *Primary Examiner.*

W. A. SKLAR, *Assistant Examiner.*